United States Patent [19]

Takahashi et al.

[11] Patent Number: 4,607,523
[45] Date of Patent: Aug. 26, 1986

[54] CRANK ANGLE DETECTING APPARATUS FOR AN INTERNAL COMBUSTION ENGINE

[75] Inventors: Minoru Takahashi; Teruo Fukuda, both of Kobe; Toshiaki Isobe, Nagoya; Mamoru Kobashi, Aichi, all of Japan

[73] Assignees: Fujitsu Ten Limited, Kobe; Toyota Jidosha Kabushiki Kaisha, Toyota, both of Japan

[21] Appl. No.: 776,864

[22] Filed: Sep. 17, 1985

[30] Foreign Application Priority Data

Sep. 20, 1984 [JP] Japan .................................. 59-197289
Dec. 29, 1984 [JP] Japan .................................. 59-279922

[51] Int. Cl.⁴ .......................................... G01M 15/00
[52] U.S. Cl. ..................................................... 73/116
[58] Field of Search ............... 73/117.3, 116; 324/167, 324/168; 123/478, 612; 364/431.03

[56] References Cited

U.S. PATENT DOCUMENTS

4,457,286 7/1984 Katayama et al. .................. 123/612
4,553,426 11/1985 Capurka .............................. 73/116

Primary Examiner—Jerry W. Myracle
Attorney, Agent, or Firm—Staas & Halsey

[57] ABSTRACT

A crank angle sensor generates a reference position signal and a crank angle signal as an internal combustion engine rotates. A counter counts the crank angle signals and, when its count value has reached a first set value, it goes to a second set value. Where the count value of the counter changed from the first to the second set value before the generation of the reference position signal, a control circuit sets the counter to the second set value when the reference position signal is generated. Where the count value of the counter did not change from the first to the second set value before the generation of the reference position signal, the control circuit sets the counter to the second set value when the counter is at the first set value and the reference position signal is produced.

3 Claims, 8 Drawing Figures

CRANK ANGLE DETECTING APPARATUS FOR AN INTERNAL COMBUSTION ENGINE

BACKGROUND OF THE INVENTION

1. Field of the Invention

The present invention relates to an improvement in or relating to a crank angle detecting apparatus for an internal combustion engine.

2. Description of the Prior Art

It is customary in the art to detect the crank angle of an internal combustion engine for ignition and fuel injection control based on the detected value, to ensure smooth running of the engine. A relatively simple-structured crank angle sensor is usually employed for detecting the crank angle of the internal combustion engine.

Figure 8:
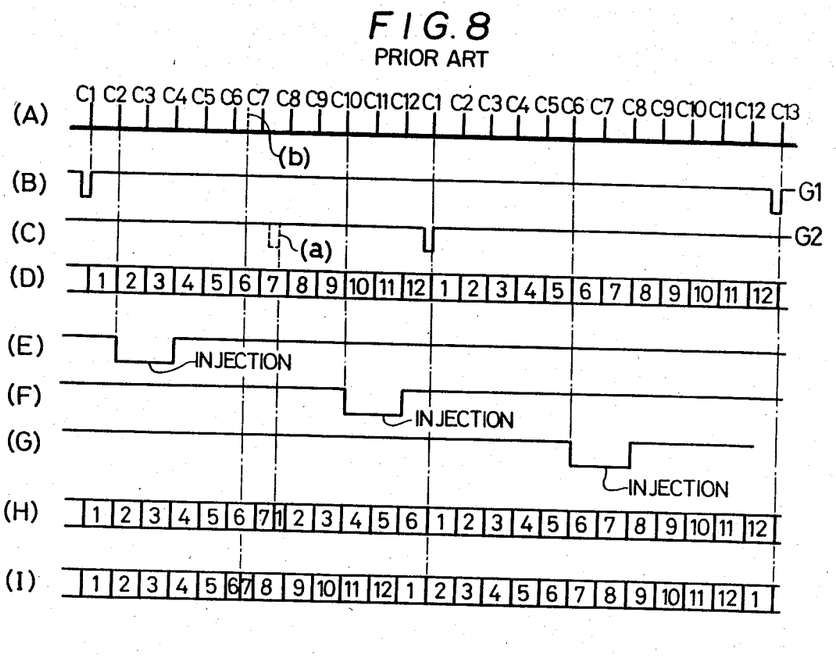
FIG. 8 is a timing chart for explaining the operation of a prior art example.

The crank angle sensor produces crank angle signals C1 to C12 and first and second top dead center signals G1 and G2, for example, as shown in FIGS. 8(A) to 8(C). The crank angle signals C1 to C12 are each created whenever the internal combustion engine (the crankshaft) rotates through a fixed angle (30° CA in this case). The first and second top dead center signals G1 and G2 are alternately produced at a predetermined position (at the top dead center in this instance) during each rotation of the internal combustion engine.

Conventionally the crank angle of the internal combustion engine is detected through use of such a crank angle sensor in the following manner. A counter is provided which is incremented by one upon each application of one of the crank angle signals C1 to C12 and is preset to "1" when supplied with one of the top dead center signals G1 and G2. Further, a decision means is provided to decide which of the first and second top dead center signals was applied when the counter was at its full count "12". The crank angle of the internal combustion engine is detected based on the result of decision by the decision means and the count value of the counter. For example, when the signals shown in FIGS. 8(A) to 8(C) are provided by the crank angle sensor, since the count value of the counter varies with the crank angle of the internal combustion engine, as depicted in FIG. 8(D), the crank angle can be obtained from the count value of the counter.

Fuel injection control and ignition control are carried out according to the count value of the counter and the result of the decision by the decision means. For instance, in the case of performing fuel injection control of a six-cylinder internal combustion engine, fuel is injected into first and fifth cylinders at the timing when the counter goes to "2" after the detection of the first top dead center signal G1, as indicated by FIG. 8(E); fuel is injected into third and sixth cylinders at the timing when the counter goes to "10" after the detection of the first top dead center signal G1, as indicated by FIG. 8(F); and fuel is injected into second and fourth cylinders at the timing when the counter goes to "6" after the detection of the second top dead center signal G2, as indicated by FIG. 8(G).

The above conventional method for the detection of the crank angle of the internal combustion engine for its fuel injection and ignition control, encounters the following problem. When noise is superimposed on the first or second top dead center signal G1 or G2, the count value of the counter does not agree with the actual crank angle of the internal combustion engine, and consequently, ignition and fuel injection control based on such a count value will not permit smooth running of the internal combustion engine. For example, in the event that noise (a) is superimposed on the top dead center signal G2, as shown in FIG. 8(C), the counter will go to "1" upon the occurence of the noise (a), as depicted in Fig. 8(H), so that the count value remains inconsistent with the crank angle until the top dead center signal G2 is applied next.

As a solution to this problem, the following arrangement has been proposed. It includes a counter which is incremented by one upon each application of one of the crank angle signals C1 to C12 shown in FIG. 8(A) and is preset to "1" upon application of one of the crank angle signals C1 to C12 when the counter is at the full count "12", and a decision means for deciding which of the first and second top dead center signals G1 and G2 was applied when the count value was "12". Ignition and fuel injection control takes place according to the result of the decision by the decision means and the count value of the counter. With such an arrangement, even if noise is superimposed on the first or second top dead center signal G1 or G2, the count value of the counter can be made to correspond to the crank angle of the internal combustion engine. For instance, even when the noise (a) is super-imposed on the second top dead center signal G2 shown in FIG. 8(C), the count value of the counter is "7" at the occurrence of noise and will not be preset by the noise (a) to "1". Thus the count value is always in agreement with the crank angle of the internal combustion engine.

However, the above prior art example has the following drawback. When noise is superimposed on the crank angle signals C1 to C12, since the count value of the counter and the crank angle of the internal combustion engine will not correspond semipermanently, ignition control and fuel injection control based on such a count value will not provide smooth running of the internal combustion engine. For instance, in the event that noise (b) is superimposed on the crank angle signals C1 to C12, as shown in FIG. 8(A), the counter goes up to "7" from "6" at the timing of generation of the noise (b) and goes to "1" upon application of the crank angle signal C12, as shown in FIG. 8(I). As a result, the count value of the counter semipermanently deviates from the crank angle of the internal combustion engine by 30° CA. In other words, the count value of the counter is "1" at the occurrence of each of the top dead center signals G1 and G2 but the top dead center signals are neglected, resulting in a semipermanent deviation of 30° CA between the count value and the crank angle of the internal combustion engine.

Furthermore, the two prior art examples described above are both defective in the following point, too. When noise is superimposed on the crank angle signal in the case where the first and second top dead center signals G1 and G2 cannot be detected as a result of bad contact or some other cause, the count value of the counter and the crank angle of the internal combustion engine will not correspond until the top dead center signals G1 and G2 can be detected again. Accordingly, ignition control and fuel injection control based on such a count value is likely to introduce troubles in the internal combustion engine, and will not allow smooth running thereof.

SUMMARY OF THE INVENTION

It is therefore an object of the present invention to provide a crank angle detecting apparatus for an internal combustion engine which permits accurate detection of the crank angle even if noise is superimposed on the crank angle signal or reference position signal.

Another object of the present invention is to provide a crank angle detecting apparatus for an internal combustion engine which maintains the internal combustion engine in its normal condition even if the reference position signal cannot be detected.

Figure 1:
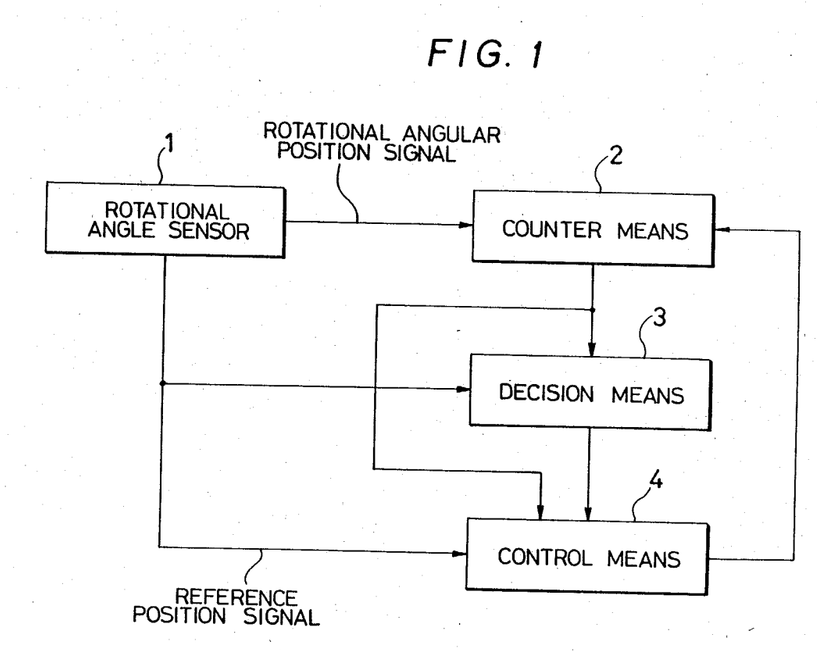
FIG. 1 is a block diagram of an embodiment of the present invention.

In accordance with an aspect of the present invention, the crank angle detecting apparatus includes a crank angle sensor 1, a counter means 2, a decision means 3 and a control means 4, as shown in FIG. 1. The crank angle sensor 1 creates a reference position signal at a reference position in each rotation of the internal combustion engine and a crank angle signal each time the internal combustion engine rotates through a fixed angle. The counter means 2 counts such crank angle signals from the crank angle sensor 1 and, when having reached a first set value, it goes to a second set value upon application of the next crank angle signal. The decision means 3 decides whether or not the counter means 2 changed from the first to the second set value prior to the generation of the reference position signal. When it is decided by the decision means 3 that the counter means 2 did not change from the first to the second set value prior to the generation of the reference position signal, the control means 4 controls the counter means 2 to go to the second set value under the conditions that the counter means 2 is at the first set value and that the reference position signal has been created. When it is decided by the decision means 3 that the counter means 2 changed from the first to the second set value before the generation of the reference position signal, the control means 4 controls the counter means 2 to go to the second set value at the occurrence of the reference position signal.

Figure 2:
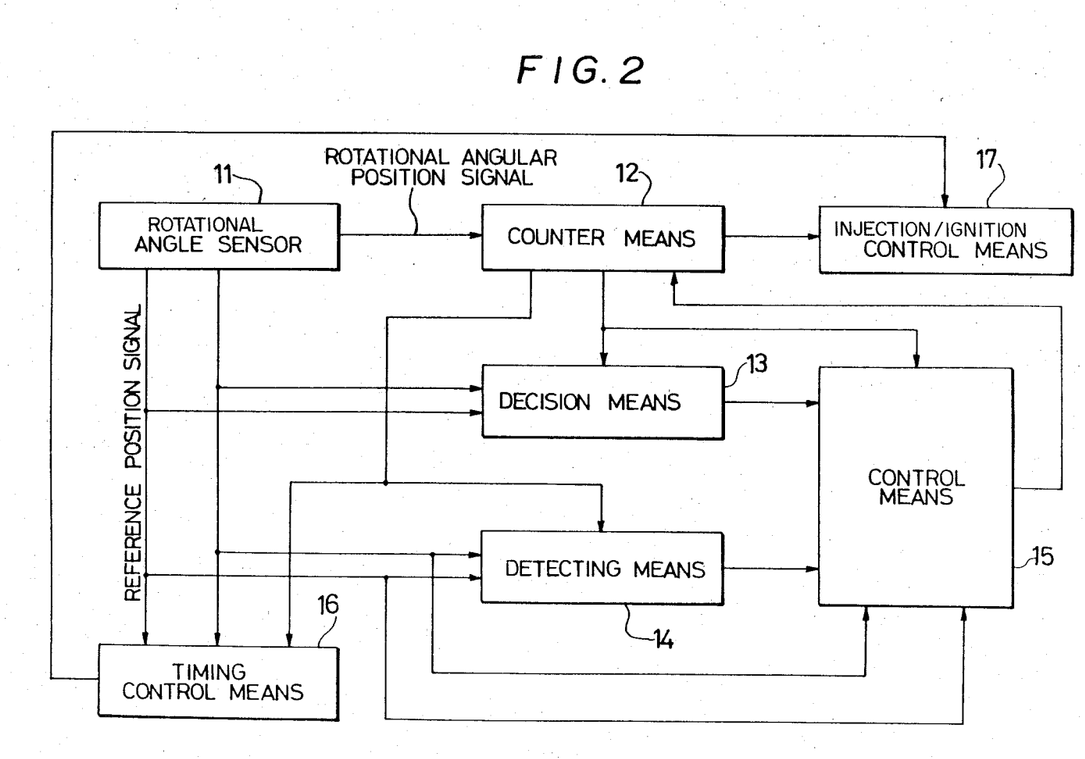
FIG. 2 is a block diagram of another embodiment of the present invention.

In accordance with another aspect of the present invention, the crank angle detecting apparatus includes a crank angle sensor 11, a counter means 12, a decision means 13, a detecting means 14 and a control means 15, as shown in FIG. 2. The crank angle sensor 11 creates a crank angle signal upon each rotation of the internal combustion engine through a fixed angle and produces first and second reference position signals alternately at a predetermined position in one process of the internal combustion engine. The counter means 12 counts such crank angle signals from the crank angle sensor 11 and, after reaching a first set value, it goes to an initial value upon application of the next crank angle signal. The decision means 13 decides whether the counter means 12 changed from the first set value to the initial value prior to the creation of the first or second reference position signal. The detecting means 14 detects, based on the count value of the counter means 12 and the first and second reference position signals from the crank angle sensor 11, that the first and second reference position signals are no longer applied. When it is decided by the decision means 13 that the counter means 12 did not change from the first set value to the initial value before the generation of the first or second reference position signals, the control menas 15 controls the counter means 12 to go to the initial value under the conditions that the counter means 12 is at the first set value and that the first or second reference position signal has been created. When it is decided by the decision means 13 that the counter means 12 changed from the first set value to the initial value prior to the creation of the first or second reference position signal, the control means 15 controls the counter means 12 to go to the initial value. When it is detected by the detecting means 14 that neither of the first and second reference position signals has been applied, the control means 15 controls the counter means 12 to go to a second set value. For example, in the case of performing ignition control and fuel injection control in a 6-cylinder internal combustion engine in accordance with its detected crank angle, a timing control means 16 and a fuel injection and ignition control means 17 are further included, as shown in FIG. 2. The timing control means 16 assumes one of its two output modes in accordance with the first or second reference position signal under the conditions that the counter means 13 is at the first set value and that the first or second reference position signal has been generated. When the counter means 12 changes from the first set value to the initial value prior to the occurrence of the first or second reference position signal, the timing control means 16 assumes the other output mode. The fuel injection and ignition control means 17 performs fuel injection control and ignition control of the internal combustion engine in accordance with the count value of the counter means 12 and the output of the timing control means 16.

DESCRIPTION OF THE PREFERRED EMBODIMENTS

Figure 3:
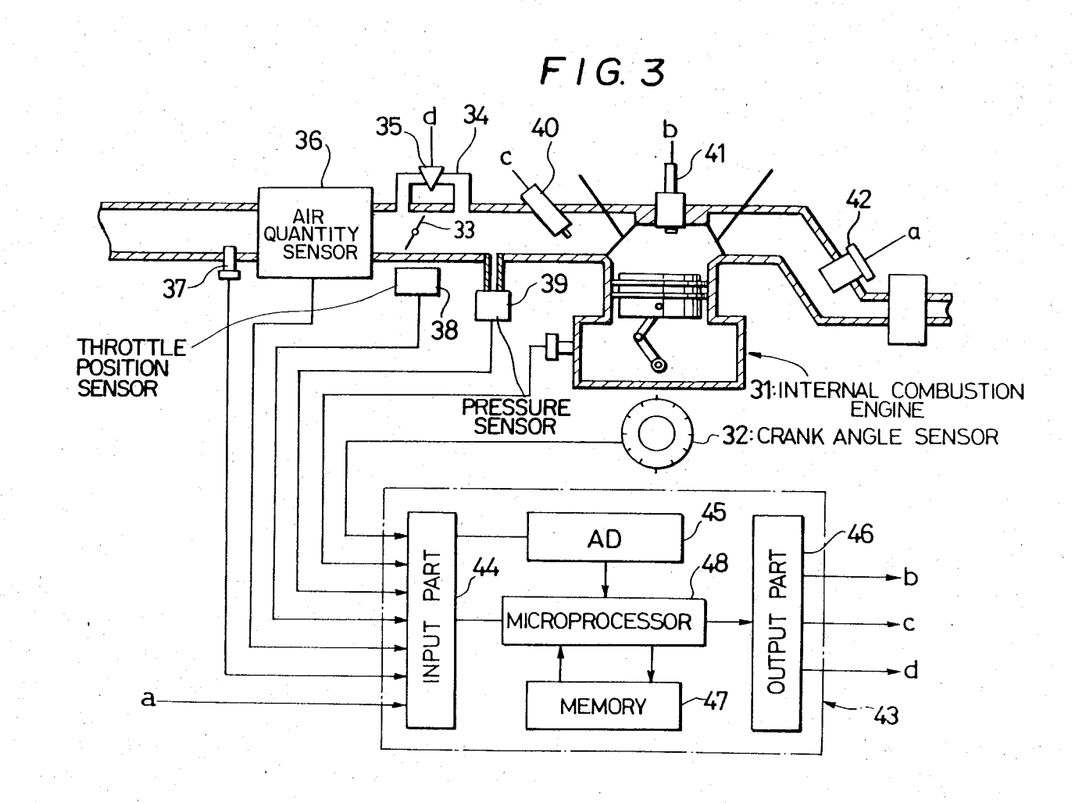
FIG. 3 is a block diagram of an internal combustion engine control device to which the present invention is applied.
Figure 4:
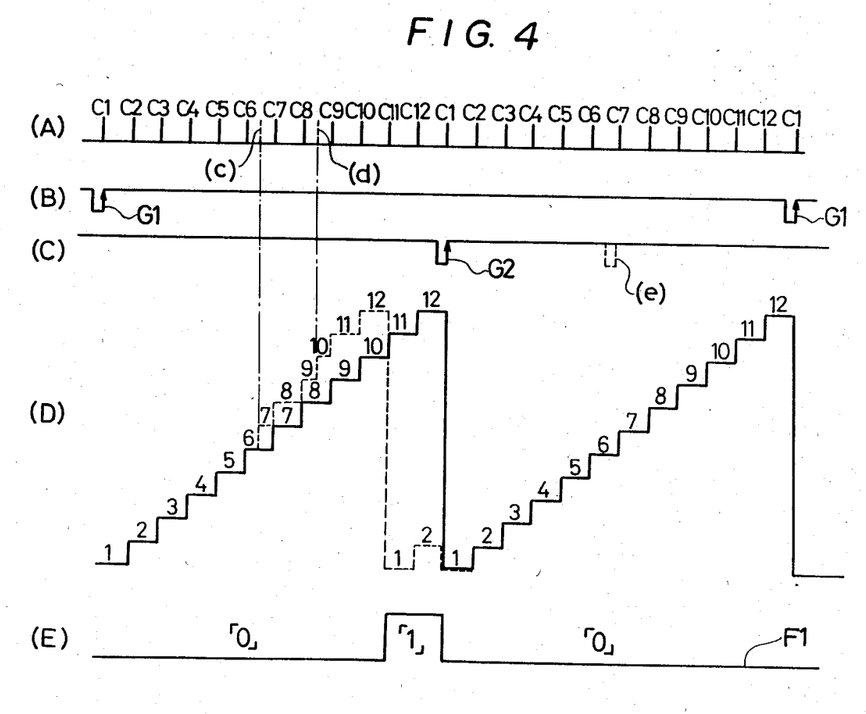
FIG. 4 is a timing chart for explaining the operation of the device shown in FIG. 3 when a microprocessor performs the processing described with respect to FIG. 5.
Figure 5:
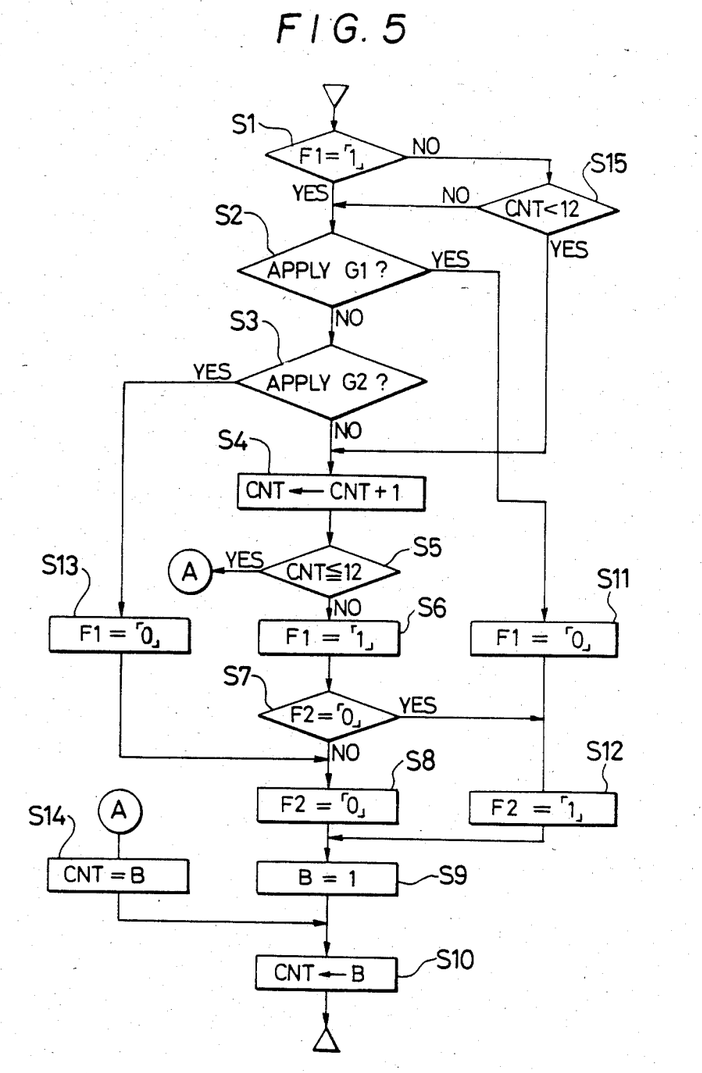
FIG. 5 is a flowchart of an example of the processing performed by the microprocessor.

FIG. 3 illustrates in block form a control device for an internal combustion engine to which the present invention is applied. Reference numeral 31 indicates an internal combustion engine, 32 a crank angle sensor, 33 a throttle valve, 34 a by-pass which goes around the throttle valve 33, 35 an idle speed control valve (an isc valve), 36 an air amount sensor for sensing the amount of intake air, 37 an intake air temperature sensor for sensing the temperature of the intake air, 38 a throttle position sensor for sensing the position of the throttle valve 33, 39 a pressure sensor for sensing the pressure in an intake pipe, 40 an injector, 41 an ignition plug, 42 an $O_2$ sensor, 43 a processing part, 44 an input part, 45 an A/D converter, 46 an output part, 47 a memory and 48 a microprocessor. The crank angle sensor 32 creates crank angle signals C1 to C12 and top dead center signals G1 and G2, as shown in FIGS. 4(A) to (C). In this embodiment, one of the crank angle signals C1 to C12 is produced each time the internal combustion engine 31 rotates through 30° CA, and the top dead center signals G1 and G2 are each developed upon each rotation of the internal combustion engine 31 through 720° CA, and are phased 360° CA apart. FIG. 5 is a flowchart for an example of the processing performed by the microcomputer 48. A description of the operation of this embodiment of the present invention will be given, with reference to FIGS. 4 and 5.

The microprocessor 48 performs the processing shown in the flowchart of FIG. 5 upon each application of one of the crank angle signals C1 to C12 from the crank angle sensor 32 via the input part 44. In step S1 it is decided whether a flag F1 is a "0" or not. As described later, the flag F1 goes to a "1" when the count value CNT of a software counter, which performs counting by software in the microprocessor 48 (and which is incremented by one upon each application of one of the crank angle signals and goes to "1" with the application of the crank angle signal when it is "12"), changes from "12" to "1" prior to the application of the top dead center signal G1 or G2, and the flag F1 goes to a "0" upon application of the top dead center signal G1 or G2. It is in the case where noise has been superimposed on the crank angle signal that the count value CNT of the counter changes from "12" to "1" before the top dead center signal G1 or G2 is applied. Accordingly, step S1 is to decide whether or not noise has been superimposed on the crank angle signal.

A description will be given first of the contents of processes that the microprocessor 48 performs when it is decided in step S1 that the flag F1 is up, that is, when noise has been superimposed on the crank angle signal. When it is decided in step S1 that the flag F1 is up, (i.e., F1="1"), the microprocessor 48 checks whether the top dead center signal G1 has been applied (step S2), and if not, then checks whether the top dead center signal G2 has been applied (step S3). If the top dead center signal G2 has not been applied either, the microprocessor 48 increments the count value CNT of the software counter by one (step S4) and then checks whether the count value CNT is equal to or smaller than "12" (step S5). If not, the microprocessor 48 makes the flag F1 a "1", that is, the microprocessor 48 sets the flag F1 (step S6) and then checks whether a flag F2 is a "0" (step S7). The flag F2 is representative of the time interval occurring between the generation of the top dead center signal G1 and the generation of the signal G2, or between the generation of the top dead center signal G2 and the generation of the signal G1. The "1" state of the flag F2 corresponds to the time interval between the occurrence of the top dead center signal G1 and the occurence of the signal G2, and the "0" state of the flag F2 corresponds to the time interval between the occurrence of the top dead center signal G2 and the occurence of the signal G1. When it is decided in step S7 that the flag F2 is not down, then the microprocessor 48 makes the flag F2 a "0", B a "1" and then sets the counter to B ("1" in this instance), thereafter proceeding to another control step.

When it is decided in step S2 that the top dead center signal G1 has been applied, the microprocessor 48 resets the flag F1 (step S11), then sets the flag F2 and then performs the processing of step S9. Where it is decided in step S3 that the top dead center signal G2 has been applied, the microprocessor 48 resets the flag F1 (step S13) and then performs the processing of step S8. Where it is decided in step S5 that the count value CNT of the counter is equal to or smaller than "12", the microprocessor 48 sets the counter to the abovesaid B (step S14) and then performs the processing of step S10. Furthermore, when it is decided in step S7 that the flag F2 is down, the microprocessor 48 performs the processing of step S12.

In other words, when it is decided in step S1 that noise is superimposed on the crank angle signal from the crank angle sensor 32, the counter is made to go to "1" upon application of the top dead center signal G1 or G2 regardless of the count value CNT at that time (steps S2, S3, S9 and S10). Further, the counter is incremented by one upon each application of the crank angle signal (steps S4, S5, S10 and S14), and upon application of the crank angle signal when the counter is at the full count "12", its count value CNT is made "1" (steps S5, S9 and S10).

Next, a description will be given of the contents of processing by the microprocessor 48 in the case where it is decided in step S1 that the flag F1 is down, that is, where no noise is superimposed on the crank angle signal. When it is decided in step S1 that the flag F1 is down (i.e., F1="0"), the microprocessor 48 checks whether or not the count value CNT of the aforementioned software counter is smaller than "12" (step S15). If not, the microprocessor 48 performs the process of step S2, and if the count value CNT is smaller than "12", then it performs the process of step S4.

That is to say, when it is decided in step S1 that no noise is superimposed on the crank angle signal from the crank angle sensor 32, if the count value CNT of the counter is smaller than "12", the count value CNT is not made "1" even if the top dead center signal G1 or G2 is applied (This is achieved by skipping steps S2 and S3.), but instead it is incremented by one (steps S4, S5, S14 and S10). If the count "1" when the top dead center signal G1 or G2 is applied (steps S2, S3, S9 and S10).

Therefore, according to this embodiment, even if noises (c) and (d) are superimposed on the crank angle signals, as indicated by the broken lines in FIG. 4(A), the flag F1 is up at the point of generation of the top dead center signal G2, as shown in FIG. 4(E), and the count value CNT of the counter is made by the top dead center signal G2 to go to "1", as shown in FIG. 4(D). This eliminates the possibility of a deviation of the count value CNT from the actual crank angle of the internal combustion engine from remaining semipermanently, as in the prior art example described previously in connection with FIG. 8(E). Moreover, according to this embodiment, even in the case where noise (e) is superimposed on the top dead center signal G2, as indicated by the broken line in FIG. 4(C), since the flag F1 is down at the occurrence of the noise (e), as shown in FIG. 4(E), the counter will not respond to the noise (e) to go to "1". Accordingly, there is no likelihood that noise superimposed on the top dead center signal G1 or G2 causes a deviation of the count value CNT of the counter from the actual crank angle of the internal combustion engine, as in the prior art example referred to previously with regard to FIG. 8(D). The broken lines in FIG. 4(D) indicate the count value CNT of the counter in the event that noises (c) and (d) are superimposed on the crank angle signals.

Figure 6:
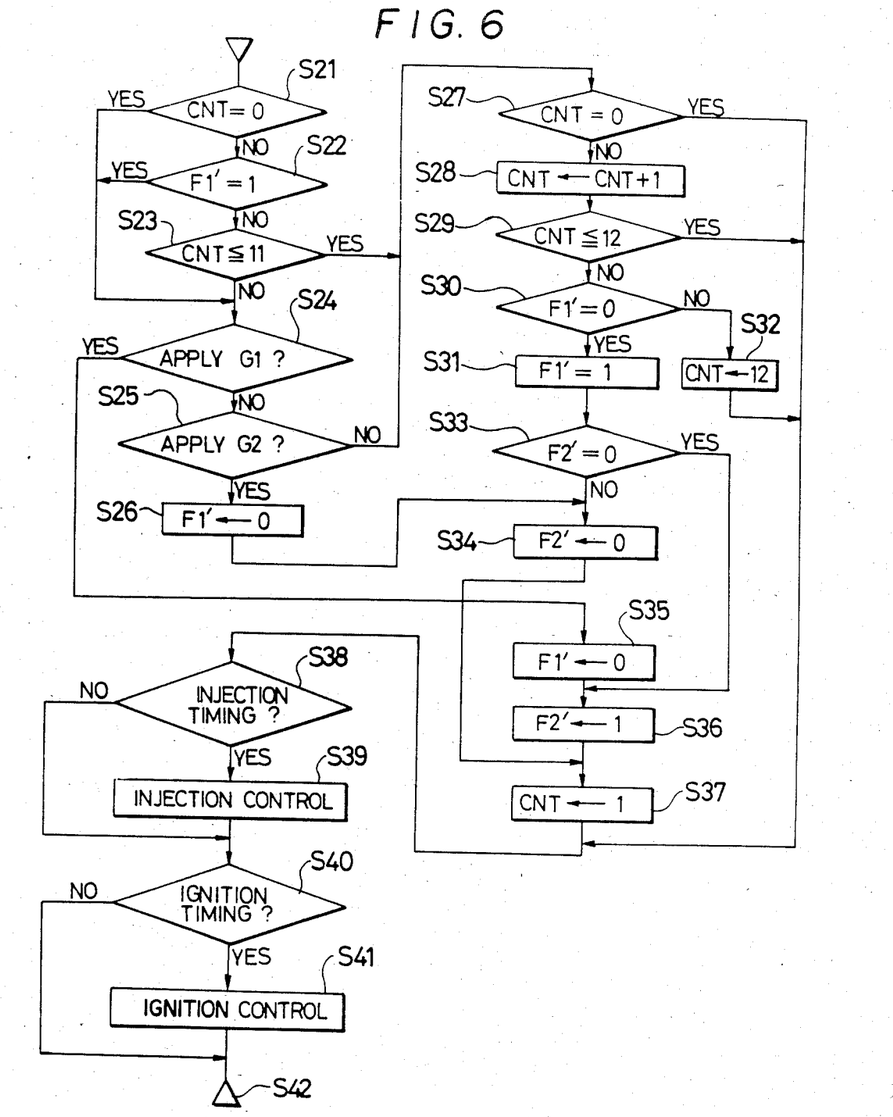
FIG. 6 is a flowchart of another example of the processing by the microprocessor.
Figure 7:
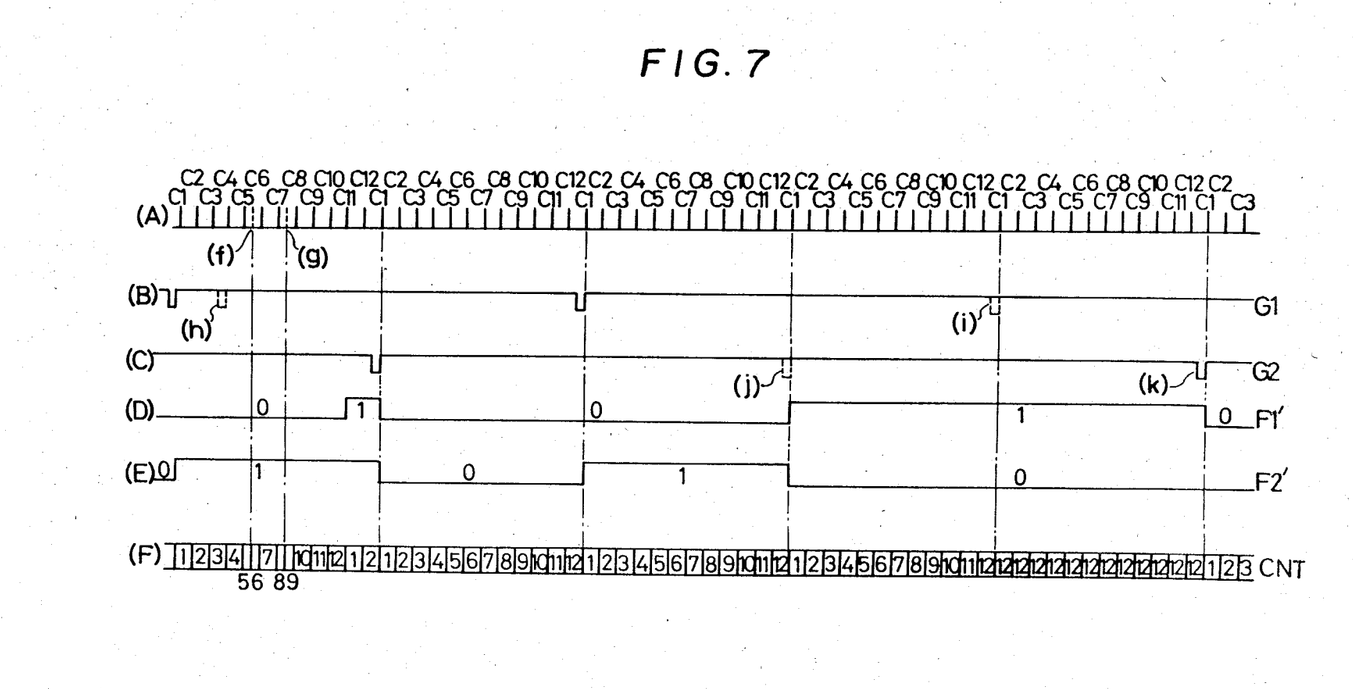
FIG. 7 is a timing chart for explaining the operation of the device shown in FIG. 3 when the microprocessor performs the processes depicted in FIG. 6.

FIG. 6 is a flowchart showing the contents of processing by the microprocessor 48 which prevents malfunction of the internal combustion engine even if the top dead center signals G1 and G2 cannot be detected. FIG. 7 is a timing chart explanatory of the operation of the device shown in FIG. 3 in the case where the microprocessor 48 performs the processing depicted in FIG. 6. Now a description will be given, with reference to FIGS. 6 and 7, of another embodiment of the present invention. Upon each application of one of the crank angle signals C1 to C12 from the crank angle sensor 32, the microprocessor 48 executes the processing shown in the flowchart of FIG. 6. In step S1 it is checked whether the count value CNT of a software counter (which is preset to "0" at the start of running of the internal combustion engine), which performs counting by software in the microprocessor 48, is "0" or not. If not, i.e. if the internal combustion engine is already in operation, then the microprocessor 48 checks whether a flag F1' is "up" or not (step S22). The flag F1' is one that, when the counter is at the count of "12", goes "up" if the top dead center signal G1 or G2 is not applied, and goes "down" if the top dead center signal G1 or G2 is applied, as described later. A circumstance arises where the counter is at the count of "12", the top dead center signal G1 or G2 is not applied and the flag F1' goes "up", when noise is superimposed on the crank angle signals C1 to C12 and the top dead center signals G1 and G2 from the crank angle sensor 32 are not applied to the processing part 43 due to bad contact or some other cause.

Where it is decided in step S22 that the flag F1' is not "up" (i.e. that the top dead center signal G1 or G2 was applied when the counter was at the count of "12" previously), it is checked whether the count value CNT of the counter is equal to or smaller than "11" (step S23). If so, then it is checked whether the count value CNT of the counter is "0" or not (step S27). Where it is decided in step S27 that the counter is at the count of "0", the microprocessor 48 checks, based on the count value CNT, whether the timing for fuel injection has been reached or not (step S38). If so, fuel injection control is performed (step S39). When the fuel injection timing has not yet been reached, it is checked whether the timing for ignition has been reached or not (step S40). If so, ignition control takes place (step S41), and if not, another control step S42 is initiated. When it is decided in step S27 that the counter is not at the count of "0", the counter is incremented by one (step S28) and then it is checked whether or not the count value CNT of the counter is equal to or smaller than "12" (step S29). In this instance, since it is decided in step S23 that the count value CNT of the counter is equal to or smaller than "11", it is decided in step S29 that the count value CNT is equal to or smaller than 12, and the microprocessor 48 executes step S38.

In the cases where it is decided in step S22 that the flag F1' is "down" and in step S23 that the count value CNT is not equal to or smaller than "11", the microprocessor 48 checks whether the top dead center signal G1 was applied or not (step S24), and if not, checks whether the top dead center signal G2 was applied or not (step S25). Upon deciding that the top dead center signal G1 was applied, the microprocessor 48 sets the flag F1' (step S35), sets a flag F2' (step S36) and makes the count value CNT of the counter "1" (step S37), thereafter proceeding to step S38. The flag F2' is representative of the time interval between the occurrence of the top dead center signal G1 or G2 and the occurrence of the top dead center signal G2 or G1. As shown in FIG. 7(E), the "1" state of the flag F2' corresponds to the period from the generation of the top dead center signal G1 to the generation of the top dead center signal G2, and the "0" state of the flag F2' corresponds to the period from the generation of the top dead center signal G2 to the generation of the top dead center signal G1. Upon deciding in step S25 that the top dead center signal G2 has been applied, the microprocessor 48 resets the flag F1' (step S26) and the flag F2' (step S34) and makes the count value CNT of the counter "1" (step S37) and then executes step S38.

Where it is decided in steps S24 and S25 that the top dead center signals G1 and G2 have not been applied, the microprocessor 48 checks whether the counter is at the count of "0" or not (step S27). If so, the microprocessor 48 proceeds to step S38, and if not, it increments the counter by one (step S28) and then checks whether the count value CNT of the counter is equal to or smaller than "12" (step S29). If so, the microprocessor 48 proceeds to step S38, and if not, it checks whether the flag F1' is "down" or not (step S30).

When it is decided in step S30 that the flag F1' is not "down", the microprocessor 48 makes the count value CNT of the counter "12" (step S32) and performs the processing of step S38. If the flag F1' is "down", then the microprocessor 48 sets it and checks whether the flag F2' is "down" or not (step S33). If not, the microprocessor 48 resets the flag F2' (step S36) and then executes step S37.

As described above, according to this embodiment, when it cannot be detected that one of the top dead center signals has been applied when the counter was at the count of "12", the flag F1' is set, and when the flag F1' is "up", it is checked whether the top dead center signals G1 and G2 have been applied upon each application of one of the crank angle signals C1 to C12 (steps S24 and S25). If so, the counter is made to have the count of "1" (step S37). Accordingly, when noise is superimposed on the crank angle signals, for instance, as indicated by (f) and (g) in FIG. 7(A), the flag F1' goes to a "1" at the moment of application of the crank angle signal C11, as shown in FIG. 7(D), and the count value CNT of the counter is made "1" by the top dead center signal G2, as depicted in FIG. 7(F). Therefore, there is no possibility that the count value CNT of the counter semipermanently deviates from the crank angle of the internal combustion engine, as in the prior art example described previously with respect to FIG. 8(I). Furthermore, even when noise (h) is superimposed on the top dead center signal G1, as indicated by the broken line in FIG. 7(B), since the flag F1' is in the "0" state when the noise is generated, as depicted in FIG. 7(D), the counter will not go to the count of "1" in response to the noise (h). Accordingly, there is no likelihood that noise superimposed on the top dead center signal G1 or G2 will cause a deviation between the count value CNT of the counter and the actual crank angle of the internal combustion engine, as occurs in the prior art example described previously in connection with FIG. 8(H). Moreover, according to this embodiment, in the event that the count value CNT of the counter exceeds "12" when the flag F1' is "up", the counter is held at the count of "12" (step S29, S30, S32). Therefore, when the top dead center signals G1 and G2 drop out as a result of bad contact or some other cause, as indicated by (i) and (j) in FIGS. 7(B) and (C), the flag F1' changes as shown in FIG. 7(D) and the counter is retained at the count of "12" until the top dead center signal G2 (indicated by k in FIG. 7(C) is applied again, as shown in FIG. 7(F). In other words, in the case where both the first and second top dead center signals G1 and G2 are not applied due to bad contact or some other cause, the counter is held at the count of "12" and will not assume the values correspond to the fuel injection timing and ignition timing, so that fuel injection and ignition are inhibited, thereby preventing the internal combustion engine from becoming out of order.

As described above, according to an aspect of the present invention, when the count value of a counter means changes from a first set value ("12" in the embodiment) to a second set value ("1" in the embodiment) prior to the generation of a reference position signal (the top dead center signal G1 or G2 in the embodiment), the counter is made to have the second set value at the occurrence of the reference position signal. Therefore, even if noise is superimposed on the crank angle signal, the period in which to cause a deviation between the count value of the counter means and the crank angle of the internal combustion engine can be limited to the period of one rotation of the internal combustion engine. Furthermore, where the counter means does not change from the first to the second set value before the generation of the reference position signal, the counter means is caused to have the second set value under the conditions that the counter means is at the first set value and that the reference position signal is produced. This offers the advantage that the count value of the counter means will not deviate from the actual crank angle of the internal combustion engine due to noise which is superimposed on the reference position signal.

In accordance with another aspect of the present invention, in the case where the count value of the counter means changes from a first set value ("12" in the embodiment) to an initial value ("1" in the embodiment) prior to the occurrence of a first or second reference position signal (the top dead center signal G1 or G2), the counter means is set to the initial value at the occurrence of the first or second reference position signals. Therefore, even if noise is superimposed on the crank angle signal, the period in which the count value of the counter means deviates from the actual crank angle can be restricted to the period of one rotation. Furthermore, in the event that the count value of the counter means does not change from the first set value to the initial value prior to the generation of the first or second reference position signal, the counter means is set to the initial value under the conditions that the counter means is at the first set value and that the first or second reference position signal is applied. This prevents the count value of the counter means from deviating from the actual crank angle of the internal combustion engine due to noise superimposed on the first or second reference position signals. Accordingly, fuel injection control and ignition control based on the count value will permit smooth running of the internal combustion engine. Moreover, when it is detected by a detecting means that both the first and second reference position signals are no longer applied, since the counter means is held at the second set value ("12" in the embodiment), neither fuel injection control nor ignition control will take place. Accordingly, even if both the first and second reference position signals are not applied due to bad contact or some other cause, no malfunction of the internal combustion engine will occur.

It will be apparent that many modifications and variations may be effected without departing from the scope of the novel concepts of the present invention.

We claim:

1. A crank angle detecting apparatus for an internal combustion engine, comprising:
    a crank angle sensor for generating a reference position signal at a reference position in each rotation of the internal combustion engine and a crank angle signal upon each rotation of the internal combustion engine through a fixed angle;
    counter means for counting the crank angle signals generated by said crank angle sensor and, when its count value has reached a first set value, going to a second set value upon application of the next crank angle signal;
    decision means for deciding whether the count value of said counter means changed from the first to the second set value prior to the generation of the reference position signal; and
    control means for controlling said counter means so that when it is decided by said decision means that the count value of said counter means did not change from the first set value to the second set value prior to the generation of the reference position signal, said counter means is made to have the second set value under the conditions that said counter means is at the first set value and the reference position signal has been generated, said control means controlling said counter means so that when it is decided by said decision means that the count value of said counter means has changed from the first to the second set value prior to the generation of the reference position signal, said counter means is made to have the second set value at the time of generation of the reference position signal.

2. A crank angle detecting apparatus for an internal combustion engine, comprising:
    a crank angle sensor for generating a crank angle signal upon each rotation of the internal combustion engine through a fixed angle and for generating first and second reference position signals alternately at a predetermined position in one process of the internal combustion engine;
    counter means for counting the crank angle signals generated by said crank angle sensor and, when its count value has reached a first set value, going to an initial value upon application of the next crank angle signal;
    decision means for deciding whether the count value of said counter means changed from the first set value to the initial value prior to the generation of one of the first and second reference position signals;
    detecing means for detecting that the first and second reference position signals will no longer be applied based on the count value of said counter means and the first and second reference position signals generated by said crank angle sensor; and
    control means for controlling said counter means so that when it is decided by said decision means that the count value of said counter means did not change from the first set value to the initial value prior to the generation of one of the first and second reference position signals, said counter means is set to the initial value under the conditions that said counter means is at the first set value and one of the first and second reference position signals has been generated, said control means controlling said counter means so that when it is decided by said decision means that the count value of said counter means has changed from the first set value to the initial value prior to the generation of one of the first and second reference position signals, said counter means is set to the initial value at the time of generation of one of the first and second reference position signals and said control means controlling said counter means so that when it is detected by said detecting means that neither of the first and second reference position signals have been applied, said counter means is held at a second set value.

3. A crank angle detecting apparatus for an internal combustion engine, comprising:
- a crank angle sensor for generating a reference position signal at a reference position in each rotation of the internal combustion engine and for generating a crank angle signal each time the internal combustion engine rotates through a predetermined angle which is less than 360°; and
- a microprocessor, coupled to said crank angle sensor and the internal combustion engine, for receiving the reference position signal and the crank angle signal and for generating a count value which is used to control the operation of the internal combustion engine, said microprocessor counting the crank angle signals generated by said crank angle sensor up to a first set value, and for generating a count value having a second set value upon application of the next crank angle signal, said microprocessor determining whether the count value has changed from the first set value to the second set value prior to the generation of the reference position signal, said microprocessor controlling the count value to have the second set value when the count value is at the first set value, the reference position signal is received from said crank angle sensor, and it is determined that the count value did not change from the first set value to the second set value prior to the generation of the reference position signal, said microprocessor controlling the count value to have the second set value when the reference position signal is received from said crank angle sensor if it has been determined that the count value changed from the first set value to the second set value prior to the generation of the reference position signal.

* * * * *

UNITED STATES PATENT AND TRADEMARK OFFICE
CERTIFICATE OF CORRECTION

PATENT NO. : 4,607,523

DATED : AUGUST 26, 1986

INVENTOR(S) : MINORU TAKAHASHI ET AL.

It is certified that error appears in the above-identified patent and that said Letters Patent is hereby corrected as shown below:

Col. 3, line 61, "menas" should be --means--.

Col. 5, line 52, "occurence" should be --occurrence--;
       line 55, "occurence" should be --occurrence--.

Col. 6, line 35, after "count" insert --value CNT is greater than "11" ("12" in this case), it is made--.

Col. 10, line 52, "detecing" should be --detecting--.

Signed and Sealed this

Eleventh Day of November, 1986

Attest:

DONALD J. QUIGG

Attesting Officer     Commissioner of Patents and Trademarks